United States Patent [19]
Glaser

[11] 3,898,481
[45] Aug. 5, 1975

[54] SIGNAL PULSE DETECTOR
[75] Inventor: Harold P. Glaser, Cincinnati, Ohio
[73] Assignee: Cincinnati Electronics Corporation, Cincinnati, Ohio
[22] Filed: Mar. 28, 1974
[21] Appl. No.: 455,931

[52] U.S. Cl............. 307/235 R; 307/253; 307/255; 307/234; 307/237; 328/112; 328/114; 328/116; 328/147; 328/163
[51] Int. Cl. ............................................. H03k 5/20
[58] Field of Search........ 307/234, 235 R, 237, 253, 307/255; 328/111–112, 114, 115–116, 146–149, 162, 163

[56] References Cited
UNITED STATES PATENTS

| | | | |
|---|---|---|---|
| 2,446,613 | 8/1948 | Shapiro | 328/163 |
| 3,095,541 | 6/1963 | Ashcraft | 307/234 |
| 3,437,833 | 4/1969 | Razaitis et al. | 307/234 |
| 3,641,444 | 2/1972 | Watts | 328/163 |

Primary Examiner—Stanley D. Miller, Jr.
Attorney, Agent, or Firm—Lowe, King & Price

[57] ABSTRACT

The occurrence of a signal pulse having predetermined characteristics in a waveform susceptible to random, noise variations, including base line drift, is detected with an apparatus including first and second channels driven in parallel by a source of the waveform. The first channel includes a differentiator that drives a voltage level comparator for deriving a gating signal while the waveform has at least a predetermined slope characteristic of the signal pulse. A minimum pulse width detector responds to the output of the comparator to indicate that the predetermined slope has subsisted for at least a predetermined interval. The output of the minimum pulse width detector drives a monostable which derives an output wave having a trailing edge in time coincidence with the maximum pulse width. The outputs of the comparator and monostable are combined in an OR gate which derives a gating voltage for a clamping circuit in the second channel, whereby replicas of the signal pulses from the source are coupled through the clamping circuit at a reference voltage, despite the base line drift. The voltage passed through the clamp is compared with a threshold level for the amplitude of the signal pulse. The output of the monostable is combined with signals passed through the clamping circuit to derive an indication that a valid signal pulse is in the waveform.

13 Claims, 10 Drawing Figures

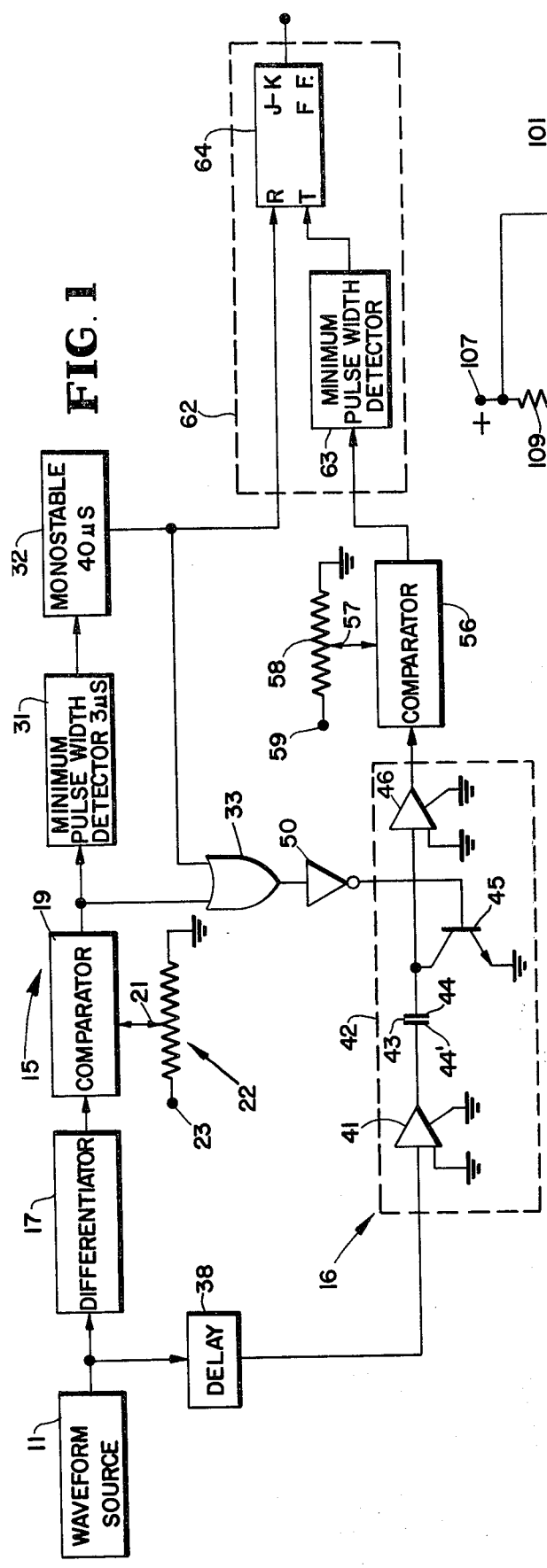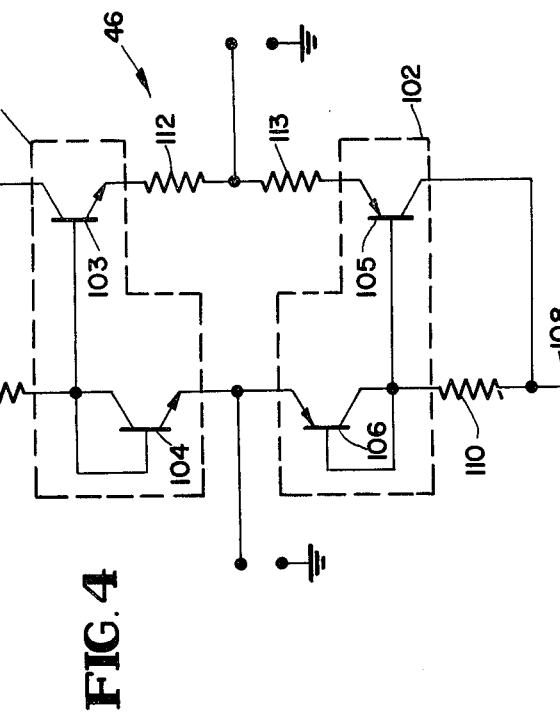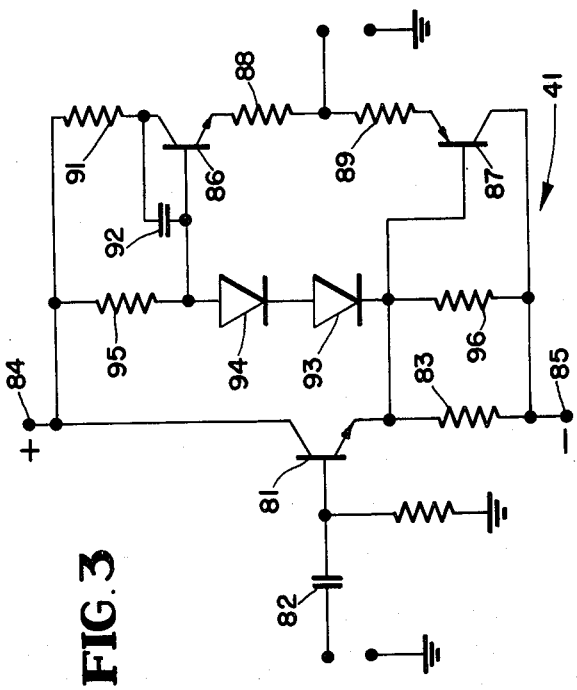

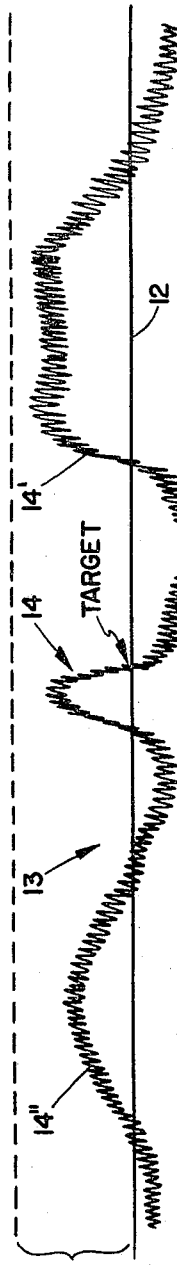
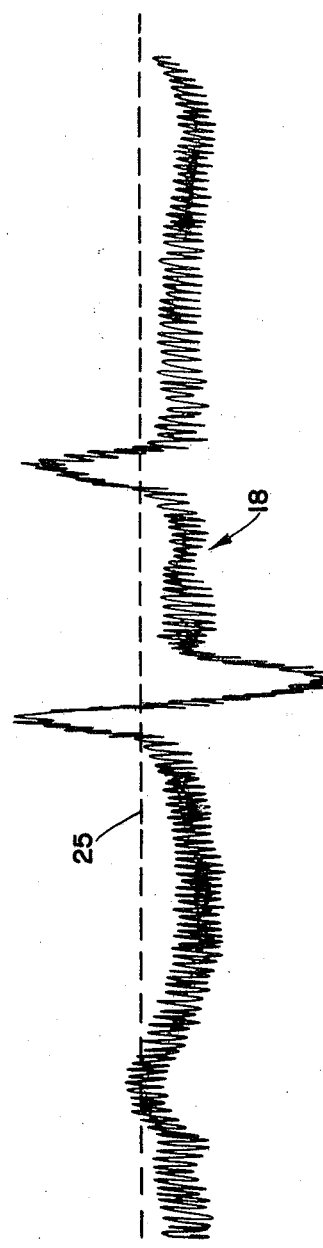
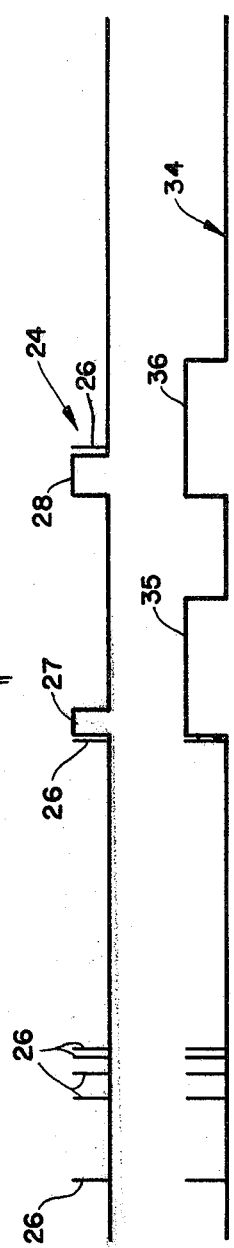
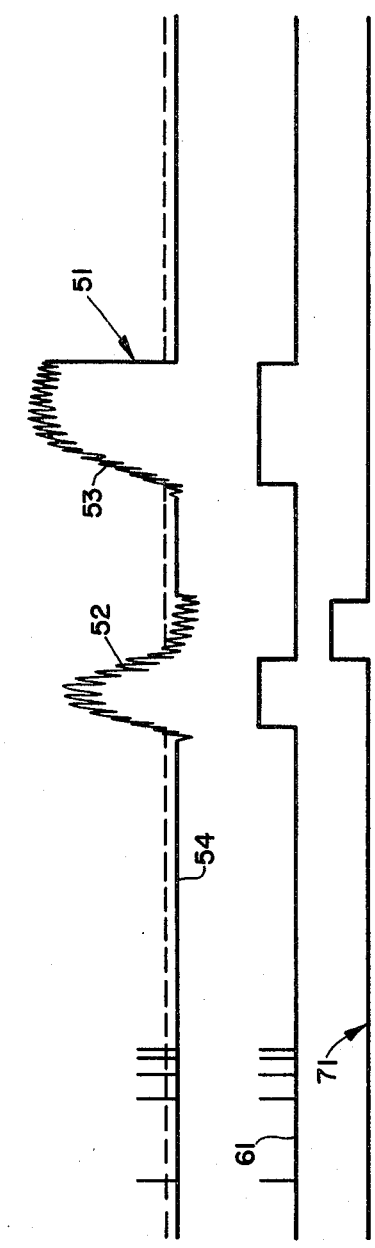
FIG.2a
FIG.2b
FIG.2c
FIG.2d
FIG.2e
FIG.2f
FIG.2g

SIGNAL PULSE DETECTOR

FIELD OF INVENTION

The present invention relates generally to apparatus for detecting signal pulses and, more particularly, to apparatus responsive to rate of change of a signal pulse.

BACKGROUND OF THE INVENTION

In many systems, it is desired to detect and recognize the presence of a signal pulse in a waveform that includes high and low frequency noise components. The low frequency noise components may be in the form of background, base line drift having frequency and amplitude variations similar to those of a signal pulse of interest. The entire waveform frequently is masked by relatively high frequency noise variations. One particular waveform characterized by these variations is an infrared point source of the type that scans over a field of view. When the infrared detector responds to a target, such as an aircraft, it derives a signal pulse having certain characteristics.

In the past it has generally been the practice to distinguish such signal pulses by detecting amplitude and pulse width by supplying the waveform to an amplitude comparator which drives a pulse width detector. The comparator has included a threshold that has either been fixed, or a function of the peak amplitude of the waveform so that the pulse width is always measured at the same relative amplitude. However, the waveform includes low frequency base line variations which cause signal pulses of interest to vary in amplitude in the waveform. Hence, in order to detect signal pulses of interest, it is necessary to place the threshold of the comparator at a level higher than the anticipated amplitude of the low frequency, base line background variations. If an attempt is made to measure the amplitude of the signal pulses, the measured amplitude equals the amplitude of the signal pulse plus the background level. Thereby, the comparator in certain instances derives an output signal falsely indicative of the presence of a signal pulse and in other instances fails to derive an output signal in the presence of a signal pulse.

While these difficulties in the prior art can be overcome, to a certain extent, by connecting a band pass filter between the waveform source and the comparator, the band pass filter results in distortion of the waveform. The distortion of the waveform causes accurate measurements of the pulse width to be difficult, if not impossible, to attain. In addition, the distortion causes a change in the amplitude of the signal pulse so that it is not possible to accurately indicate if the amplitude of the waveform corresponds with a signal pulse when the waveform is close to an amplitude threshold level.

BRIEF DESCRIPTION OF THE INVENTION

In accordance with the present invention, waveform slope, as well as amplitude and pulse duration (minimum and maximum), is employed to distinguish a signal pulse in a waveform including high and low frequency random noise variations. Detection of a signal pulse is provided by connecting a waveform source to a pair of channels in parallel. In one of the channels a circuit is provided for deriving a first signal when the slope of the waveform exceeds a predetermined level, associated with the minimum slope of a signal pulse. The first signal is applied to a minimum pulse width detector, which derives a binary one level after the predetermined slope has subsisted for at least a predetermined duration. The minimum pulse width detector activates a monostable which derives a binary one output having a trailing edge in time coincidence with the maximum duration of a signal pulse. The first signal and the output of the monostable are combined in an OR gate to activate a clamp circuit so that the clamp can pass the waveform in substantially unaltered form, i.e., the clamp derives a replica of the waveform. The output of the clamp is referenced to a predetermined voltage level, such as ground, regardless of the base line drift of the input waveform, since the clamp includes a series capacitor and shunt switching type element that is driven from a relatively low impedance state to a relatively high impedance state in response to the first signal and the output of the monostable. By activating the clamp in response to the first signal, even though the first signal may be derived in response to noise rather than a signal pulse, the clamp is exercised very early in the signal pulse and the clamp output is directly proportional to the waveform.

The output of the clamp drives an amplitude comparator which derives a binary one output signal only in response to the pulse amplitude, as referenced to the predetermined voltage, being in excess of a value associated with a signal pulse. The output of the comparator is combined with the output of the monostable in a pulse width detector, thereby preventing pulses less than the minimum duration and more than the maximum duration from being indicated as signal pulses.

A further feature of the invention is that inherent delay provided by the differentiator and comparison network of the first channel is compensated by a delay network in the second channel. Thereby, the waveform gated through the clamp circuit corresponds to the waveform variation which activates the switching element of the clamping circuit.

While I am aware of prior art devices which have responded to the slope of a detected waveform to distinguish the waveform from other signals, these prior art systems have either not dealt with the problem of base line drift or have been relatively complicated. By utilizing a relatively uncomplicated clamping circuit, the present invention derives a waveform that is a faithful replica of signal pulses in the input waveform while removing variations due to base line, background drift.

It is, accordingly, an object of the present invention to provide a new and improved apparatus for detecting the occurrence of a signal pulse having a predetermined characteristic in a waveform susceptible to random, noise variations.

Another object of the invention is to provide a new and improved apparatus for detecting the occurrence of a signal pulse having predetermined characteristics in a waveform susceptible to random, noise variations, including base line drift.

A further object of the invention is to provide a new and improved apparatus for detecting the occurrence of a signal pulse susceptible to base line variations by detecting the slope of a waveform including the signal pulse.

A further object of the invention is to provide a new and improved apparatus for detecting the occurrence of a signal pulse having a predetermined, minimum slope, a predetermined minimum duration, a predetermined maximum duration, and at least a predetermined amplitude, in a waveform susceptible to random, noise variations including base line drift.

Another object of the invention is to provide a new and improved apparatus for detecting the occurrence of a signal pulse in a waveform susceptible to random, noise variations, including base line drift, by removing the base line drift of the signal pulse without distorting the signal pulse.

Another object of the invention is to provide a new and improved apparatus for detecting the occurrence of a signal pulse in a waveform susceptible to base line drift variations having leading edges with slopes on the same order of magnitude as the slopes of signal pulses.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIG. 1 is a combined schematic and block diagram of a preferred embodiment of the invention;

FIGS. 2a–2g are illustrations of waveforms in the apparatus of FIG. 1;

FIG. 3 is a circuit diagram of driver amplifier employed in the circuit of FIG. 1; and FIG. 4 is a circuit diagram of a buffer amplifier employed in the circuit of FIG. 1.

DETAILED DESCRIPTION OF THE DRAWING

Reference is now made to FIG. 1 of the drawing wherein there is illustrated a source 11 that derives signal pulses having predetermined characteristics. The slope of the leading edge of each pulse has at least a predetermined magnitude, the amplitude of each signal pulse has at least a predetermined magnitude, and the duration of each signal pulse exceeds a first predetermined value but is less than a second predetermined value. The signal pulses derived from source 11 are buried in a waveform that is susceptible to random, noise variations, including base line drift, thereby making it difficult to detect the signal pulses. In a typical situation, the ratio of peak signal pulse amplitude to rms noise is 7.5 to 1 while the ratio of peak signal pulse to peak noise is 2 to 1.

A typical example of source 11 is the signal derived from an infrared point source detector that is scanned over a field of view to detect a target which is indicated by the signal pulse. In such a situation, the pulse has a 6 microsecond minimum rise time and a 40 microsecond maximum length. The amplitude of the pulse is dependent upon the sensitivity of the detector included in source 11, as well as the intensity of the target which emitted the pulse and the distance between the infrared detector and the target.

A typical replica of the waveform derived from the infrared detector of source 11 is illustrated in FIG. 2a wherein the voltage output of source 11 is plotted as a function of time. In FIG. 2a, a zero, d.c. reference level is represented by the horizontal line 12, while the voltage variations derived from source 11 are represented by waveform 13. Waveform 13 includes random noise components that are in the form of high frequency variations, as well as low frequency background base line drift. The only target illustrated in FIG. 2a is pulse 14 which is buried in the high and low frequency noise variations of the signal. It is noted that the signal pulse 14 has an amplitude less than the amplitude of the background drift 14' illustrated in FIG. 2a to the right of the target signal pulse, and an amplitude on the same order of magnitude as the background drift 14'' illustrated to the left of the target signal pulse. It is also noted that the leading edge of the target signal pulse 14 has a slope on approximately the same order of magnitude as the slope of the background base line drift 14', but that the target signal pulse has a duration considerably less than that of background drift 14'. It is also noted that the slope of the leading edge of the target signal pulse 14 is considerably in excess of the slope of the background, base line drift 14''. While the invention, in its most specific embodiment, is described in connection with detection of target signal pulse 14 in waveform 13, it is to be understood that the principles of the invention are applicable to the detection of other types of signal pulses and that detection is not limited to infrared applications.

The apparatus for enabling target signal pulse 14 to be detected is illustrated in FIG. 1, which broadly includes first and second channels 15 and 16, driven in parallel by the waveform derived from source 11. Broadly, channel 15 includes circuitry responsive to slope variations of source 11, while channel 16 responds to signals derived from channel 15 to gate the waveform of source 11, clamp the gated waveform to a reference level (ground) and detect if the amplitude of the gated, clamped waveform exceeds a predetermined level characteristic of a target.

Channel 15 includes a differentiating circuit 17 which derives an output illustrated in FIG. 2b as waveform 18 that is a replica of the first derivative of the signal derived from source 11. In one preferred embodiment, differentiator 17 is a high pass, resistance capacitance filter. other circuits capable of deriving an output having amplitude variations responsive to the slope of source 11, e.g., a bandpass filter, can be employed. It is noted that the high frequency, random noise variations existing on waveform 13 are of even higher frequency in waveform 18, but that the relatively long duration background noise variations, due to drift, that are on waveform 13 do not appear in waveform 18. However, waveform 18 includes relatively large positive going leading edge segments respectively coincident with the leading edge of the target signal pulse 14 and the relatively rapid background base line drift 14'. The maximum amplitudes of the swings of waveform 18 in response to the leading edges of pulse 14 and the background variation 14' are approximately equal.

The output signal of differentiator 17 is applied to comparator 19 which includes a second input responsive to a preset d.c. voltage as is derived from slider 21 of potentiometer 22 that is driven by a d.c. source at terminal 23. Comparator 19 normally derives a zero output level in response to the output of differentiator 17 being less than a threshold voltage at slider 21. While the output of differentiator 17 exceeds or is equal to the threshold voltage, comparator 19 derives a fixed, positive output level, as illustrated in FIG. 2c by waveform 24. The threshold level for comparator 19, as determined by slider 21, is indicated in FIG. 2b by horizontal line 25, whereby comparator 19 derives a fixed output voltage whenever the waveform 18 exceeds the threshold indicated by line 25. It is, thereby, noted from FIG. 2c that comparator 19 derives very short duration noise spikes 26 substantially while certain high frequency variations in the waveform are derived from source 11, as well as longer duration pulses 27 and 28 that are substantially in time coincidence with the times while the slope of waveform 13 exceeds slope threshold value 25; pulses 27 and 28 are substantially in time coincidence with the leading edges of target signal pulse 14 and the background variation 14'. The leading edges of spikes 26, as well as pulses 27 and 28, are displaced in time from the portions of waveform 13 to which they are responsive only by the inherent time of comparator 19 to derive an output pulse in response to slopes of waveform 13 that exceed the predetermined value necessary to activate the comparator, a time typically on the order of 0.5 microseconds. Hence, the output signal of comparator 19 is derived a predetermined time subsequent to the initiation of the waveform 13 having a slope in excess of the threshold set by slider 21. This predetermined time is the time required for the output of differentiator 17 to respond to the slope of waveform 13 and derive an output that exceeds the threshold of comparator 19.

To discriminate against the short duration spikes 26 derived from comparator 19, a minimum pulse width detector 31 is connected to the output of comparator 19. Minimum pulse detector 31 normally derives a binary zero output level and is activated into a binary one state only in response to comparator 19 deriving a finite, non-zero output voltage for in excess of a predetermined time period. In general, detector 31 is adjusted so that it responds to pulses from comparator 19 that are no more than approximately fifty percent of the rise time of the fastest rise time of signal pulses in the waveform of source 11. Since the minimum rise time of signal pulses derived from IR point source 11 is 6 microseconds, detector 31 is adjusted to respond to pulses having a minimum width of 3 microseconds. In a preferred embodiment, pulse detector 31 is a Schmidt trigger which derives pulses having trailing edges in time coincidence with the trailing edges of pulses from comparator 19.

The output signal of minimum pulse width detector 31 is applied to monostable multivibrator 31, which enables signal pulse 14 to be distinguished from background variation 14'. Monostable multivibrator 32 responds to each binary one level applied to it by detector 31 to derive a binary one signal having a predetermined length equal to the maximum duration of a signal pulse in the waveform of source 11 minus the minimum detection time of detector 31; for IR point source 11, monostable 32 derives a binary one level having a duration of 40 microseconds. The 40 microsecond pulse derived from monostable 32 has a leading edge in time coincidence with the leading edge of binary one pulses derived from minimum pulse width detector 31. Because of the high frequency of binary one spikes from comparator 19, monostable 32 would be generating binary one outputs for an excessive time duration (perhaps almost all of the time) if pulse detector 31 were excluded; the excessive generation of a binary one by monostable 32 would prevent accurate detection of signal pulses.

To derive a gating voltage for signal pulse 14, the output signals of comparator 19 and monostable multivibrator 32 are combined in OR gate 33. Thereby, OR gate 33 derives a binary one level in response to every pulse 26, (FIG. 2c) as derived from comparator 19, as well as in response to every 40 microsecond binary one level derived from monostable 32. OR gate 33 thereby derives an output waveform 34, FIG. 2d, having short duration spikes coincident with spikes 26, as long as a spike 26 occurs more than 40 microseconds after the leading edge of an output of monostable 32. Waveform 34 also includes binary one levels 35 and 36 having durations of 43 microseconds and leading edges in time coincidence with the leading edges of the binary one levels 27 and 28 in waveform 24 at the output of comparator 19. The 43 microsecond duration of binary one levels 35 and 36 occurs by combining the output of comparator 19 with the output of monostable 32 in OR gate 33.

Consideration is now given to the apparatus included in channel 16. The output of source 11 is applied to channel 16 through delay circuit 38, having a delay time equal to the delay inherently provided by a differentiator 17 and comparator 19 of channel 15, so that channel 15 makes slope decisions on the same waveform portion as is processed by channel 16.

As indicated supra, this inherent delay is 0.5 microseconds, whereby the leading edges of pulses or levels derived from comparator 19 occur approximately 0.5 microseconds after the signal in waveform 13 that cause the pulse or binary one level in the output of comparator 19. Delay circuit 38 derives a waveform that is an accurate replica of the waveform derived from source 11. To these ends, in accordance with one preferred embodiment of the invention, delay element 38 comprises three cascaded, integrated circuit d.c. operational amplifiers. It is to be understood, however, that other types of delay elements could be provided, such as a low pass resistance capacitance filter, as long as the output of the delay element is a relatively faithful replica of the waveform of source 11.

The output of delay element 38 is applied to driver amplifier 41 of clamping circuit 42, that functions as a gate for waveform 13, as referenced to ground. Driver circuit 41 is a d.c. amplifier that drives series capacitor 43, having an output electrode 44 that is normally connected to ground through the saturated, low impedance shunt emitter collector path of bipolar NPN transistor switch 45, having a base driven by the output of OR gate 33 as coupled through inverter 50, which derives a positive d.c. voltage for biasing transistor 45 to saturation. The saturated, low impedance emitter collector path of transistor 45 normally clamps electrode 44 of capacitor 43 to the reference, ground potential to which the emitter of the transistor is connected. Driver 41 has a relatively low output impedance, approximately eleven ohms, so that capacitor 43 can be charged much faster than the duration of one signal pulse from source 11 to assure that the voltage at the output of driver 41, as applied to electrode 44' of capacitor 43, is a replica of the input waveform while transistor 45 is in a low impedance state. In response to OR gate 33 deriving a binary one level, as indicated by waveform 34, inverter 50 derives a zero output voltage that drives the emitter collector path of transistor 45 into a high impedance state. Thereby, electrode 44 is no longer connected through a relatively low, virtually short circuit, impedance to ground. Instead, the voltage at electrode 44 is a replica of the variations of waveform 13, as referenced to ground. With transistor 45 in a low impedance emitter collector state, capacitor 43 is charged through the short time constant circuit including the emitter collector path of transistor 45. When transistor 45 is switched to a high impedance, relatively open circuit condition, a long time constant is provided for capacitor 43 so that the zero reference level remains and the variations at electrode 44 follow the variations of waveform 13.

To prevent charge on capacitor 43 from bleeding off while transistor 45 is in a high impedance, relatively nonconducting state, the capacitor is connected to a buffer amplifier 46 having a relatively high input impedance, on the order of 50 kilohms. To assure a faithful reproduction at the output of buffer amplifier 46 of the variations of the source 11 while transistor 45 is in a high impedance cut-off state, the time constant of the impedance comprising: capacitor 43, the cut-off impedance transistor 45 and the input impedance of buffer 46 must be much greater than the duration of output pulses of monostable 32. This result can be achieved by employing a buffer having an input impedance on the order of 50 kilohms, in combination with a high grade capacitor for capacitor 43 and a relatively conventional bipolar transistor 45. It is also possible to utilize a field effect transistor instead of bipolar transistor 45, but the bipolar transistor is generally preferred because the saturation voltage thereof is less than the source drain voltage of a fully conductive field effect transistor, thereby providing clamping closer to ground potential.

The output voltage of clamping circuit 42, derived from the output of buffer amplifier 46, is illustrated by waveform 51, FIG. 2e. It is noted that waveform 51 includes short duration pulses corresponding with the variations of the amplitude of waveform 13, regardless of the level of the waveform relative to the reference line 12. The pulses are in time coincidence with the spikes that are derived at the output of OR gate 33, as reflected in waveform 34. As seen infra, these short duration pulses have no effect on the output signal ultimately derived. In addition, waveform 51 includes relatively faithful replicas 52 and 53 of the amplitude variations in waveform 13 while binary one levels 35 and 36, in waveform 34, are derived from OR gate 33. Hence, replicas of the signal pulses 14 and the leading edge of the background drift 14' are derived from clamping circuit 42. The output of clamping circuit 42 is referenced to the ground potential (indicated in FIG. 2e by line 54) at the emitter of transistor 45 regardless of the background level of waveform 13 relative to ground.

To eliminate variations in the output of clamping circuit 42 less than a predetermined level, the output of buffer amplifier 46 is applied as one input to comparator 56, having a second input responsive to a reference, threshold voltage derived from slider 57 of potentiometer 58 that is connected to a positive d.c. source at terminal 59. The voltage at slider 57 establishes a threshold level for comparator 56 whereby the comparator derives a binary one output signal, illustrated by waveform 61, FIG. 2f, whenever the output of clamping circuit 42 exceeds the threshold level.

The output signal of comparator 56 is supplied to pulse width discriminator 62 which derives an output signal indicative of a target pulse signal having been received. Pulse width discriminator 62 thereby eliminates pulses having leading edges which occur for less than 3 microseconds and a total duration in excess of 43 microseconds. Pulses having leading edges less than three microseconds are due to high frequency noise variations, while pulses in excess of 43 microseconds are caused by base life drift. It might appear that the elimination of pulses having less than a three microsecond rise time could be achieved by driving the base of transistor 45 solely in response to the output of monostable 32, rather than by using a pulse width discriminator including a minimum pulse time detector. It has been found, however, that it is necessary in many instances to activate transistor 45 in response to the output of comparator 19 directly and to utilize a pulse discriminator having a minimum time duration, so that the clamping action of circuit 42 can be initiated in the first 3 microseconds of the target signal pulse 14. Thereby, even though noise is occasionally coupled through clamp 42 in response to the output of comparator 19 activating transistor 45 into a cutoff state, more accurate indications of a valid signal pulse amplitude are derived by utilizing the present system since charging of capacitor 43 occurs at the beginning of a signal pulse. If the clamp were activated three microseconds after the beginning of the signal pulse, the maximum amplitude of the signal pulse would not be gated through clamp 42 and certain signal pulses would not be recognized because the amplitude of the clamp circuit output would be less than the threshold level of comparator 56.

One arrangement for implementing the pulse width discriminator 62 while enabling the threshold level of comparator 56 to be set to a very low level and preventing false target indications in response to noise involves feeding the output of comparator 56 to minimum pulse width detector 63 which drives a trigger input of J-K flip-flop 64, having a reset input responsive to the output of monostable 32. Pulse width detector 63 derives a binary one output having a leading edge delayed by a predetermined time, slightly in excess of the minimum detection time of detector 31, after the leading edge of a binary one output of comparator 56. Thereby, false triggering of flip-flop 64 by the output of detector 63 is prevented. It is noted that detector 31 responds to slope variations of waveform 13 in excess of a predetermined duration, while detector 56 responds to amplitude variations of waveform 13 in excess of a predetermined duration. The trailing edges of the outputs of comparator 56 and detector 63 are in time coincidence. The trigger input of flip-flop 64 responds to the trailing edge of the output of detector 63 so that the flip-flop changes state every time a trailing edge is generated by the detector. The reset input of flip-flop 64 responds to the output level of monostable 32 so that the flip-flop is always in a zero state while the monostable output is zero. Thereby, a binary one level is derived from an output of flip-flop 64 in response to a valid target signal pulse occurring in waveform 13. The one output level has a leading edge in time coincidence with the trailing edge derived from detector 63 and a trailing edge in time coincidence with the output of monostable 32.

The leading edge of the binary one output from flip-flop 64 indicates detection of a target. If a pulse of less than the minimum three microseconds, detectable pulse duration occurs in waveform 13, no output is derived from flip-flop 64 because pulse detector 63 is not activated and flip-flip 64 is not triggered to the binary one state. If a pulse in waveform 13 subsists for more than 43 microseconds, such as pulse 14', no output is derived from flip-flop 64 since the trigger input of the flip-flop is inhibited by the binary zero level applied by monostable 32 to the reset input of the flip-flop. In response to target pulse 14, flip-flop 64 remains in a binary zero state while binary ones are derived from monostable 32 and detector 63. However, when target pulse 14 subsides, the output of comparator 56 drops to a binary zero value, causing detector 63 to trigger flip-flop 64 into the binary one state, where the flip-flop remains until the trailing edge of monostable 32 drives the flip-flop back to the zero state.

Flip-flop 64 responds to waveform 13 to derive waveform 71, illustrated in FIG. 2g. It is noted that waveform 71 has a binary one level occurring only after the occurrence of target pulse 14, and not in response to any other variations of waveform 13. The leading edges of binary one levels derived from flip-flop 64 can drive a circuit which derives an output to indicate the presence of target pulse 14. Also, the output of flip-flop 64 enables circuitry for determining the amplitude and duration of the target signal pulse, and can drive visual indicators, such as oscilloscopes, which can be employed to monitor target pulse variations.

One preferred embodiment of driver 41 of clamping circuit 42 is illustrated in the schematic diagram of FIG. 3. Driver circuit 41 includes an emitter follower input containing NPN transistor 81, having a base electrode a.c. coupled by capacitor 82 to the output of delay element 38. Voltage developed across emitter resistor 83 of transistor 81, having collector and emitter electrodes respectively connected to positive and negative d.c. power supply voltages at terminals 84 and 85, is d.c. coupled to the bases of complementary NPN and PNP transistors 86 and 87. Transistors 86 and 87 are connected in a push-pull configuration, with the collectors thereof respectively connected to the positive and negative voltages at terminals 84 and 85. The emitters of transistors 86 and 87 are connected to output resistors 88 and 89, having a common terminal at which an output voltage is derived and d.c. coupled to capacitor 43. Resistors 88 and 89 are of relatively low value, such as eleven ohms, to provide the desired, relatively low impedance output of driver amplifier 41.

To prevent oscillation at the output of driver 41, the collector of transistor 86 is connected through resistor 91 to terminal 84, while capacitor 92 is connected in shunt with the base collector junction of transistor 86. Bias control for the base emitter junction of transistor 86 is provided by a pair of series connected, silicon diodes 93 and 94 which are poled in the same direction so that positive d.c. current flows through them from positive supply terminal 84 to negative supply terminal 85. D.C. bias for the base of transistors 86 and 87 is also provided by resistors 95 and 96 which are respectively connected between terminal 84 and the base electrode of transistor 86 and terminal 85 and the base electrode of transistor 87.

A preferred embodiment for buffer amplifier 46 included in clamping circuit 42 is illustrated in FIG. 4. The circuit of FIG. 4 has the required relatively high input impedance, on the order of 50 kilohms, as well as a relatively low output impedance. The buffer amplifier of FIG. 4 is also characterized by being referenced to the same potential (ground) as its input, between the emitter and collector of transistor 45 so that there is no offset between the input and output terminals of the buffer. In addition, the buffer is characterized by having a very fast response time because it has basically an emitter follower, push-pull output. Lack of offset in the buffer amplifier 46 is attained by providing diodes in the input circuit of the buffer amplifier that are matched to the emitter base junctions of complementary, push-pull output transistors.

To these ends, the buffer amplifier includes two cans 101, 102, in each of which is mounted a pair of transistors having matched base emitter junctions. In can 101, NPN transistors 103 and 104 are provided, while in can 102 PNP transistors 105 and 106 are provided. Transistors 104 and 106 are connected as diodes, by short circuiting the base and collector terminals thereof together by a jumper strap. The emitters of transistors 104 and 106 are driven in parallel by the voltage developed at output electrode 44 of capacitor 43. To provide the 50 kilohm input impedance for the buffer amplifier, the bases of transistors 104 and 106 are connected to positive and negative d.c. power supply voltages at terminals 107 and 108 through 100 kilohm resistors 109 and 110.

The voltages developed across resistors 109 and 110 drive the bases of transistors 103 and 105, respectively. Transistors 103 and 105 are connected in push-pull, with the collectors thereof being directly connected to terminals 107 and 108, respectively. The emitters of transistors 103 and 105 are connected to each other through a pair of series resistors 112 and 113, each of which has a resistance of approximately 10 ohms. The common terminal between resistors 112 and 113 is the output terminal of the buffer amplifier, as referenced to ground. The output terminal of the buffer amplifier is the output terminal of the clamping circuit and is connected directly to the input of voltage comparator 56.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. Apparatus for detecting the occurrence of a pulse having predetermined characteristics in a waveform susceptible to random, noise variations including base line drift, comprising first and second channels driven in parallel by a source of the waveform, means in said first channel for deriving a gating signal while the waveform has at least a predetermined slope characteristic of the pulse, a clamping circuit in said second channel for normally blocking passage of said waveform and for normally deriving an output signal having a reference level, and for enabling the pulse from the source to be coupled through the clamping circuit in response to derivation of said gating signal, said clamping circuit including means for referencing the pulse coupled through it to the reference level regardless of the level of the base line drift of the waveform accompanying the signal pulse, said clamping circuit including a series capacitor and a shunt switch normally biased to a low impedance state for maintaining the voltage of one electrode of the capacitor substantially at the reference level, said shunt switch being driven to a high impedance state in response to the gating signal for enabling a voltage that is a replica of the pulse to be developed at the one electrode, and means for detecting the amplitude of the voltage of said one electrode.

2. The apparatus of claim 1 wherein the means in the first channel for deriving the first signal causes the first signal to be derived a predetermined time subsequent to the initiation of a waveform segment having the at least predetermined slope, and means in said second channel for delaying the waveform that is applied to the gating means by an amount substantially equal to the predetermined time between the derivation of the first signal and the initiation of the waveform segment.

3. The apparatus of claim 1 further including a source of the waveform, said source being a scanning infrared point source detector.

4. The apparatus of claim 1 wherein the clamp includes a high input impedance buffer for deriving an output that is a replica of the signal pulse developed at the one electrode, said buffer including a pair of series input diodes and a push-pull output having a pair of transistors, each of said diodes being connected to drive the emitter base junction of a different one of the transistors, each diode having a junction matched to the junction of the transistor it drives.

5. The apparatus of claim 1 wherein the clamp includes a driver having a push-pull, low impedance output connected in d.c. circuit with said capacitor, a pair of transistors comprising the push-pull, low impedance output, and means for suppressing oscillation in the push-pull output.

6. The apparatus of claim 5 wherein the means for suppressing oscillation includes a resistor in the collector circuit of one of the transistors and a capacitor shunting the base collector junction of said one transistor.

7. Apparatus for detecting the occurrence of a pulse having predetermined characteristics in a waveform susceptible to random, noise variations comprising first and second channels driven in parallel by a source of the waveform; means in said first channel for deriving a first signal substantially while the waveform has at least a predetermined slope that is characteristic of the pulse and for deriving a second signal indicative of the first signal having an occurrence of at least a predetermined minimum duration, gate means in said second channel having an output, said gate means normally blocking passage of said waveform while deriving a reference level at the output and for deriving at the output a replica of the waveform while said first signal is being derived; means for deriving a third signal in response to the output level of the gate means deviating from the reference level by at least a predetermined amplitude characteristic of the pulse; and means responsive to the simultaneous occurrence of the second and third signals for deriving a fourth signal indicative of the waveform having the predetermined slope and at least the predetermined amplitude for at least the predetermined minimum duration to indicate the occurrence of the pulse.

8. The apparatus of claim 7 wherein said gate means comprises a clamping circuit including a series capacitor and a shunt switch normally biased to a low impedance state for maintaining the voltage of an output electrode of the capacitor substantially at the reference level, said shunt switch being driven to a high impedance state in response to the first signal for enabling a voltage that is a replica of the waveform to be developed at the one electrode.

9. The apparatus of claim 8 further including means for inhibiting the derivation of the fourth signal in response to pulses in the waveform having the predetermined slope and duration in excess of a predetermined maximum duration characteristic of the maximum duration of the pulse.

10. The apparatus of claim 9 wherein the means for inhibiting includes means for deriving a binary signal having a predetermined length substantially equal to the predetermined maximum duration, means for driving the shunt switch to the high impedance state in response to the binary signal so that the gate means derives a replica of the waveform while the binary signal has the predetermined length, and means combining the binary signal and the third signal for deriving the fourth signal only in response to the third signal having a duration less than the predetermined maximum duration.

11. The apparatus of claim 7 wherein the means in the first channel for deriving the first signal causes the first signal to be derived a predetermined time subsequent to the initiation of a waveform segment having the at least predetermined slope, and means in said second channel for delaying the waveform that is applied to the gating means by an amount substantially equal to the predetermined time between the derivation of the first signal and the initiation of the waveform segment.

12. The apparatus of claim 7 further including means for inhibiting the derivation of the fourth signal in response to pulses in the waveform having the predetermined slope and duration in excess of a predetermined maximum duration characteristic of the maximum duration of the pulse.

13. The apparatus of claim 12 wherein the means for inhibiting includes means for deriving a binary signal having a predetermined length substantially equal to the predetermined maximum duration, means for enabling the gate means in response to the binary signal so that the gate means derives a replica of the waveform while the binary signal has the predetermined length, and means combining the binary signal and the third signal for deriving the fourth signal only in response to the third signal having a duration less than the predetermined maximum duration.

* * * * *